United States Patent Office 3,556,980
Patented Jan. 19, 1971

3,556,980
REMOVAL OF WATER FROM BITUMINOUS EMULSION
Lincoln Clark, Newport Beach, Calif., and Victor P. Kaminsky, Edmonton, Alberta, Canada, assignors of thirty percent each to Cities Service Athabasca, Inc., a corporation of Delaware, Imperial Oil Limited, a corporation of Canada, and Atlantic Richfield Corporation, a corporation of Pennsylvania, and ten percent to Royalite Oil Company, Limited, a corporation of Canada
No Drawing. Filed June 17, 1968, Ser. No. 737,300
Int. Cl. C10g *1/00*
U.S. Cl. 208—11        8 Claims

ABSTRACT OF THE DISCLOSURE

Bituminous emulsion such as that produced in the hot water process for recovery of bitumen from tar sand is treated for removal of water by first applying shearing force to the emulsion to coalesce water and then recovering bitumen from the coalesced water. Energy is preferably imparted to the emulsion by shearing forces in amounts between about 500 and about 4,000 foot pounds (ft.-lbs.) per pound of bitumen in the emulsion and the shearing forces may be applied in various ways such as pumping the emulsion through pipes.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling, to recover an emulsion, or froth, which contains some of the fines, and quantities of coarse sand. Such an emulsion or froth is referred to herein as a bituminous emulsion.

Although the bituminous emulsion employed as the feedstock of this invention is not dependent on any particular technique in the water extraction of bituminous sand, one well-known method for preparing such emulsions is often referred to as the "hot-water process." In the hot-water process, the bituminous sand is slurried with steam and hot water at about 180° F. and the pulp is then agitated with a stream of circulating hot water and carried to a separation cell maintained at an elevated temperature of about 180° F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% bitumen.

Separation of water and mineral solids from the bituminous emulsion is necessary for most ultimate uses of the bitumen. However, the separation of water and mineral solids from the emulsion is difficult.

A number of methods have been proposed for breaking bituminous emulsions and recovering the bitumen. However, these generally suffer from various shortcomings such as incomplete separation or high cost. One such method involves gravity settling of solids and water after dilution with light hydrocarbon solvent.

In accordance with the present invention, water may be removed from bituminous emulsions such as those formed as described above by imparting shearing energy to the emulsion to coalesce the water and then recovering bitumen from the coalesced water.

Shearing forces may be applied to the bituminous emulsion in any suitable manner such as by violently agitating the emulsion with impellers or other mechanical agitating means. A preferred method of applying shearing forces to the emulsion is by pumping the emulsion. Substantial shearing energy may be imparted by gear pumps or other conventional types of pumps and additional energy may be imparted by forcing the emulsion through a conduit or between closely spaced surfaces. Generally, cylindrical conduits having effective internal diameters of between about ¼ inch and about 2 inches are preferred for this purpose. Pressure differentials suitable for use in pumping emulsions through pipes or between surfaces may, of course, vary widely but differentials of between about 100 and about 800 p.s.i. are preferred when forcing emulsion through the preferred type of conduit described immediately above. If desired, a pump may be used merely to provide pressure differential for forcing emulsion through suitable means such as a conduit described above. Alternatively, a pump may be used for imparting all or part of the shearing energy to the emulsion.

Regardless of what means is used to apply the shearing force to the emulsion, sufficient shearing energy should be imparted to coalesce water in the emulsion. It has been found that maximum benefits may be obtained if shearing energy is imparted to the emulsion in amounts between about 500 and about 4,000 ft.-lbs. of energy per pound of bitumen in the emulsion. The use of additional amounts of shearing energy usually produces very little additional benefit for the additional expense. Likewise, the use of less than about 500 ft.-lbs. of shearing energy per pound of bitumen usually does not produce the desired result of coalescing substantial quantities of water.

In practicing the present invention, the temperature at which the shearing forces are applied to the bituminous emulsion has a significant effect upon the process. Temperatures less than about 90° F., or more than about 150° F. have been found to be relatively ineffective and temperatures in the range of between about 95 and about 120° F. are preferred to obtain maximum coalescence of water at minimum cost. At temperatures below about 95° F. it becomes difficult to handle the emulsion because of increased viscosity of the bitumen and at temperatures above about 120° F. it becomes difficult to apply the necessary amount of shearing energy to the emulsion because of the relatively low viscosity of bitumen at higher temperatures.

Recovery of bitumen from the coalesced water of the bituminous emulsion may be accomplished in a number of suitable ways. For instance, the emulsion containing coalesced water may merely be allowed to settle so that the water forms a lower layer which may be removed. This, however, is a rather slow, inefficient method of separation and other, faster techniques are preferred. One preferred method for recovering bitumen from the bituminous emulsion is by contact with a moving inclined surface which causes the bitumen to be removed from the less viscous coalesced water because of preferential adherence of the bitumen to the moving surface. Once this separation has been accomplished, the bitumen may be removed from the surface and collected while the water may be collected separately and discarded or recycled to an earlier stage of a bitumen recovery process as may be desired. A roller or inclined surface, as shown for instance in Canadian Pat 778,347 to McLatchie et al., or counter rotating cylinders, as shown for instance in U.S. Pat. 2,174,849 to Stevens are examples of suitable means for recovery of bitumen from coalesced water. Separation of coalesced water from bitumen in this manner may be accomplished at any suitable temperatures, such as between about 50 and about 140° F.

By applying shearing force to aqueous bituminous emulsions to coalesce water and then removing the coalesced water in accordance with the present invention, it is possible to reduce the water content of the recovered bitumen down to less than about fifteen and frequently less than about ten pounds of water per hundred pounds of oil (bitumen). This is in contrast to the usual 25 to 200 pounds of water per hundred pounds of oil present in such emulsions as recovered from hot water tar sand processes. By contrast, ordinary settling of high water content emulsions will reduce water content only to about 100 pounds of water per hundred pounds of oil.

The following example will illustrate the usefulness of the present invention in recovery of bitumen from bituminous sands.

EXAMPLE

To demonstrate the invention, bituminous emulsion obtained from treatment of bituminous sands in a hot water process was treated by applying shearing force and then recovering bitumen from coalesced water and measuring the water content of the recovered bitumen (i.e. uncoalesced water). The emulsion used for this purpose contained 64.07 wt. percent bitumen, 28.31 wt. percent water and 7.61 wt. percent solids, mostly fines of the type described above. The emulsion thus contained about 44 pounds of water per hundred pounds of bitumen.

Shearing force was applied to this emulsion by pumping the emulsion through a twenty foot length of one-half inch inside diameter tubing. Coalesced water was then separated from bitumen and uncoalesced water at room temperature using a rotating cylinder. Bitumen containing uncoalesced water was recovered from the cylinder, sampled to determine water content and then again pumped through the pipe and subjected to roller dewatering as described above. This procedure was repeated for a total of seven stages or runs. During each stage, additional shearing energy was imparted to the bitumen and uncoalesced water (i.e. emulsion). The cumulative shearing energy imparted to the bitumen samples is shown in Table I below along with the composition and water to oil relationship for the bitumen sample taken after each run. Table I shows, for instance, that the product bitumen sample taken after run 3 had had a total of 1612.7 ft.-lbs. per pound of shearing energy imparted to it during the 3 runs and contained 14.65 lbs. of water per lb. of bitumen after the third run. The energy input or pumping portion of the process was carried out at a temperature maintained between 114 and 118° F. Table I below shows the cumulative shearing energy input and resulting product water to oil content of recovered bitumen for various energy inputs ranging from about 400 ft.-lbs. per pound of bitumen to close to 4,000 ft.-lbs. per pound of bitumen.

TABLE I.—EFFECT OF VARYING AMOUNTS OF SHEAR ENERGY

| Run No. | Cumulative shearing energy input[1] | Bitumen product composition, wt. percent | | | Water/ Oil[2] |
| --- | --- | --- | --- | --- | --- |
| | | Oil | Water | Solids | |
| Feed | | 67.07 | 28.31 | 7.61 | 44.19 |
| 1 | 417.6 | 76.81 | 17.99 | 5.20 | 23.42 |
| 2 | 1,009.4 | 80.59 | 13.82 | 5.59 | 17.15 |
| 3 | 1,612.7 | 81.44 | 11.93 | 6.63 | 14.65 |
| 4 | 2,192.9 | 84.05 | 10.85 | 5.10 | 12.91 |
| 5 | 2,749.9 | 82.97 | 10.10 | 6.93 | 12.17 |
| 6 | 3,307.1 | 83.35 | 9.04 | 7.61 | 10.85 |
| 7 | 3,865.2 | 83.09 | 8.51 | 8.40 | 10.24 |

[1] Ft. lb./lb. of oil.
[2] Lbs. of water per 100 lbs. of oil.

From the above data, it can be seen that application of shearing force to coalesce water followed by removal of water in accordance with the present invention serves to reduce water content of the bitumin product far below the minimum of about 25 lbs. of water per hundred pounds of oil possible by more conventional techniques. It can also be seen that for reduction of water content to substantially below the 25 lbs. per hundred pounds of bitumen level, shearing energies should be at least about 500 ft.-lbs. per pound of bitumen and that as total shearing energy utilized in coalescing water approaches about 4,000 ft.-lbs. per pound of bitumen additional benefits do not appear to justify the additional expense of more energy input.

While the invention has been described above with respect to certain preferred embodiments thereof, it will be understood by those skilled in the art that various changes and modifications may be made without departing from the spirit and scope of the invention and it is intended to cover all such changes and modifications in the appended claims.

We claim:
1. The process for removing water from a bituminous emulsion and recovering bitumen product therefrom which comprises imparting shearing energy to an aqueous bituminous emulsion to thereby coalesce water in such emulsion and then removing coalesced water therefrom.

2. The process of claim 1 in which shearing energy is imparted to the emulsion in amounts between about 500 and about 4,000 ft.-lbs. per pound of bitumen in the emulsion.

3. The process of claim 2 in which at least a portion of the shearing energy is imparted to the bituminous emulsion by forcing such emulsion through a cylindrical conduit.

4. The process of claim 2 in which the coalescence is carried out at temperatuers between about 95° and about 120° F.

5. The process of claim 2 in which shearing energy is imparted to the bituminous emulsion by pumping the same through a generally cylindrical conduit having an effective inside diameter between about ¼ and about two inches at a pressure differential between about 100 and about 800 p.s.i.

6. The process of claim 2 in which the water content of the bituminous emulsion is reduced from at least about 25 lbs. of water per hundred pounds of bitumen to less than about 15 lbs. of water per hundred pounds of bitumen.

7. In a process for the recovery of bitumen from bituminous sands containing the same in which a fluid slurry of bituminous sand is introduced into a separation zone containing a body of water an in which bitumen is floated to the top of such a body of water in the form of a bituminous emulsion and recovered therefrom, the improvement of which comprises imparting to said recovered emulsion between about 500 and about 4,000 foot-pounds of shearing energy per pound of bitumen in said emulsion to thereby coalesce water in said emulsion and then removing coalesced water from said emulsion.

8. The process of claim 7 in which the bituminous emulsion recovered from the body of water contains more than 25 pounds of water per 100 pounds of bitumen and in which sufficient water is subsequently coalesced and removed from such emulsion to reduce the water content thereof to between about 10 and about 23 pounds of water per 100 pounds of bitumen.

References Cited

UNITED STATES PATENTS

| | | | |
|---|---|---|---|
| 1,947,704 | 2/1934 | Fisher | 252—349 |
| 2,174,849 | 10/1939 | Stevens | 210—23 |
| 2,338,986 | 1/1944 | Waterman | 252—349 |
| 2,968,603 | 1/1961 | Coulson | 208—11 |

FOREIGN PATENTS

| | | | |
|---|---|---|---|
| 778,347 | 2/1968 | Canada | 208—11 |

CURTIS R. DAVIS, Primary Examiner

U.S. Cl. X.R.

208—187; 252—349, 358